(12) United States Patent
Hu et al.

(10) Patent No.: US 9,690,433 B2
(45) Date of Patent: Jun. 27, 2017

(54) TOUCH SUBSTRATE AND TOUCH SCREEN (71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Ming Hu, Beijing (CN); Ming Zhang, Beijing (CN); Lei Zhang, Beijing (CN); Weigang Gong, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 72 days.

(21) Appl. No.: 14/438,942

(22) PCT Filed: Sep. 10, 2014

(86) PCT No.: PCT/CN2014/086223
§ 371 (c)(1),
(2) Date: Apr. 28, 2015

(87) PCT Pub. No.: WO2015/161612
PCT Pub. Date: Oct. 29, 2015

(65) Prior Publication Data
US 2016/0246405 A1    Aug. 25, 2016

(30) Foreign Application Priority Data
Apr. 21, 2014  (CN) .......................... 2014 1 0161008

(51) Int. Cl.
*G06F 3/044* (2006.01)

(52) U.S. Cl.
CPC .... *G06F 3/044* (2013.01); *G06F 2203/04111* (2013.01); *G06F 2203/04112* (2013.01)

(58) Field of Classification Search
CPC ........... G06F 3/041; G06F 2203/04111; G06F 2203/04112
See application file for complete search history.

(56) References Cited

U.S. PATENT DOCUMENTS

| 2009/0002337 A1* | 1/2009 | Chang | G06F 3/044 345/174 |
| 2009/0194344 A1* | 8/2009 | Harley | G06F 3/044 178/18.06 |

(Continued)

FOREIGN PATENT DOCUMENTS

| CN | 102112949 A | 6/2011 |
| CN | 102216891 A | 10/2011 |

(Continued)

OTHER PUBLICATIONS

Office Action dated May 26, 2016 issued in corresponding Chinese Application No. 201410161008.6.

*Primary Examiner* — Dorothy Harris
(74) *Attorney, Agent, or Firm* — Nath, Goldberg & Meyer; Joshua B. Goldberg; Annie J. Kock (57) ABSTRACT

The present invention provides a touch substrate and a touch screen. The touch substrate comprises first electrodes and electrodes which intersect with each other, each first electrode includes a plurality of first metal meshes, adjacent first metal meshes are connected through a connection portion, each second electrode includes a plurality of second metal meshes, adjacent second metal meshes are connected through a connection bridge, the first metal meshes, the second metal meshes and the connection portion are in the same layer, and an insulation layer is provided between the layer in which the connection portion is located and the layer (Continued)

in which the connection bridge is located, at least a part of edges of the first metal mesh is provided with a first side strip thereat, the first side strip is adjacent to a corresponding second metal mesh and is connected to the first metal mesh.

11 Claims, 4 Drawing Sheets

(56) References Cited

U.S. PATENT DOCUMENTS

| | | | |
|---|---|---|---|
| 2010/0302201 A1* | 12/2010 | Ritter | G06F 3/044 345/174 |
| 2011/0007011 A1* | 1/2011 | Mozdzyn | G06F 3/044 345/173 |
| 2011/0148781 A1* | 6/2011 | Chen | G06F 3/0412 345/173 |
| 2011/0308846 A1* | 12/2011 | Ichiki | G06F 3/044 174/257 |
| 2013/0033452 A1* | 2/2013 | Fukushima | G02F 1/13338 345/174 |
| 2013/0155001 A1* | 6/2013 | Yilmaz | G06F 3/044 345/174 |
| 2013/0256008 A1* | 10/2013 | Zeng | H01H 11/00 174/257 |
| 2013/0327560 A1* | 12/2013 | Ichiki | G06F 3/044 174/133 R |
| 2014/0043280 A1* | 2/2014 | Cok | G06F 3/0412 345/174 |
| 2014/0293143 A1* | 10/2014 | Yang | G06F 1/1643 349/12 |
| 2015/0015532 A1* | 1/2015 | Choung | G06F 3/044 345/174 |
| 2015/0287381 A1* | 10/2015 | Kim | G06F 3/044 345/174 |
| 2017/0010712 A1* | 1/2017 | Yoshizumi | G06F 3/044 |

FOREIGN PATENT DOCUMENTS

| | | |
|---|---|---|
| CN | 102253752 A | 11/2011 |
| CN | 102402354 A | 4/2012 |
| JP | 2013142966 A | 7/2013 |
| TW | 201122943 A | 7/2011 |
| TW | 201310318 A | 3/2013 |

* cited by examiner

TOUCH SUBSTRATE AND TOUCH SCREEN

This is a National Phase Application filed under 35 U.S.C. 371 as a national stage of PCT/CN2014/086223, filed Sep. 10, 2014, an application claiming the benefit of Chinese Application No. 201410161008.6, filed Apr. 21, 2014, the content of each of which is hereby incorporated by reference in its entirety.

FIELD OF THE INVENTION

The present invention relates to the field of the touch technology, and particularly to a touch substrate and a touch screen.

BACKGROUND OF THE INVENTION

The screen with touch function (touch screen) has been applied more and more widely. A capacitive touch screen is an important touch screen, the capacitive touch screen is provided with a plurality of driving electrodes (Tx) and a plurality of sensing electrodes (Rx) which intersect with each other, and a capacitance is generated at a position where the driving electrode and the sensing electrode are adjacent. The driving electrodes are loaded with driving signals in a scanning manner, and sensing signals are generated on the sensing electrodes accordingly. When touch happens, for example a human body or a touch pen closes to the touch region, the capacitance between the two kinds of electrodes in the touch region is influenced, and the sensing signal on the corresponding sensing electrode is changed, so that the touch position may be determined.

To avoid the electrodes from affecting the display, conventionally, the driving electrodes and the sensing electrodes are made of transparent conductive material such as indium tin oxide (ITO). However, the resistance of ITO is high, which may affect the touch effect. Therefore, Metal mesh technology has been proposed, that is, the driving electrodes and/or the sensing electrodes are made of metal material with low resistance, such as silver, aluminum, copper, molybdenum, niobium or alloy thereof, and since the metal is opaque, the electrodes are formed into mesh shape.

Figure 1:
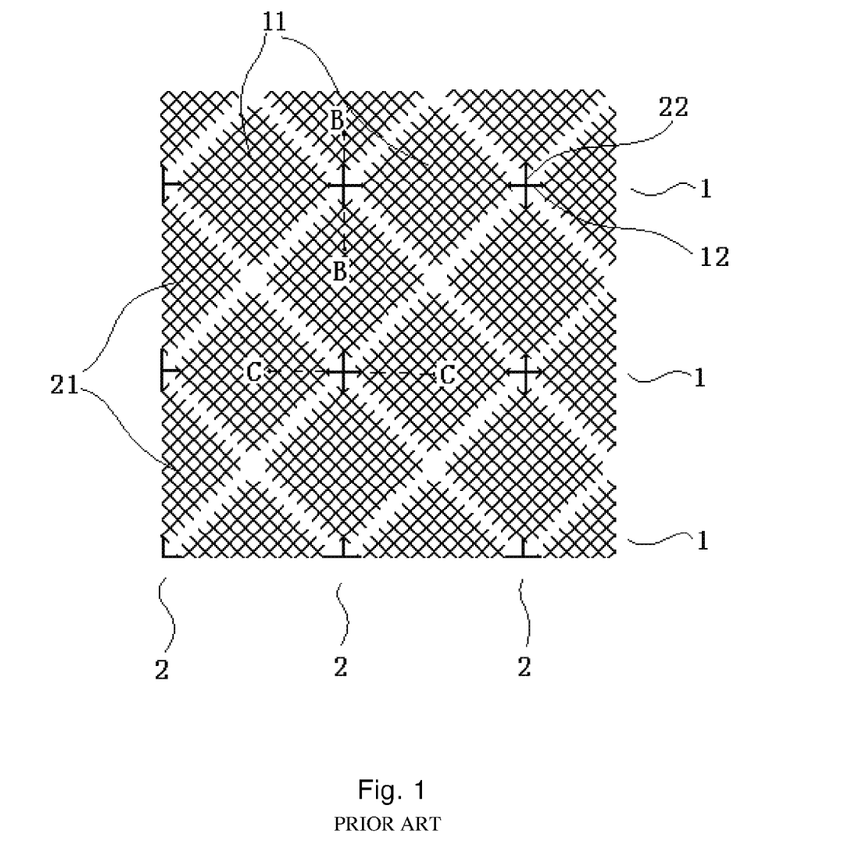
FIG. 1 is a partial top structural diagram of an existing touch substrate (the insulation layer is transparent)
Figure 2:
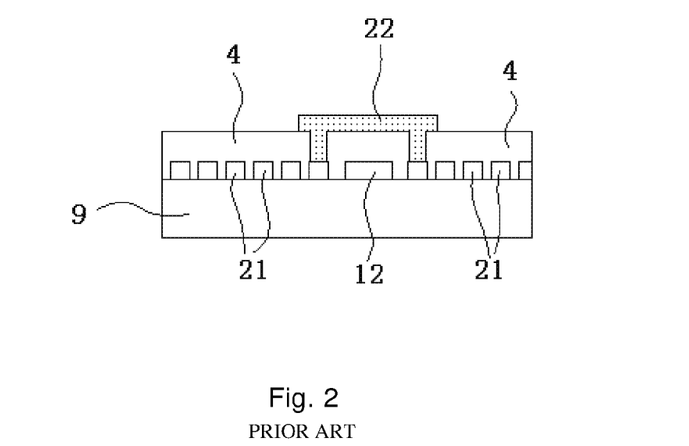
FIG. 2 is a cross-sectional structural diagram of the touch substrate in FIG. 1 taken along BB line.
Figure 3:
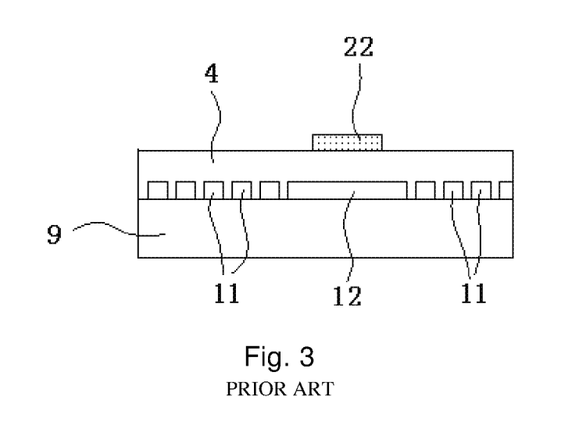
FIG. 3 is a cross-sectional structural diagram of the touch substrate in FIG. 1 taken along CC line.
Figure 4:
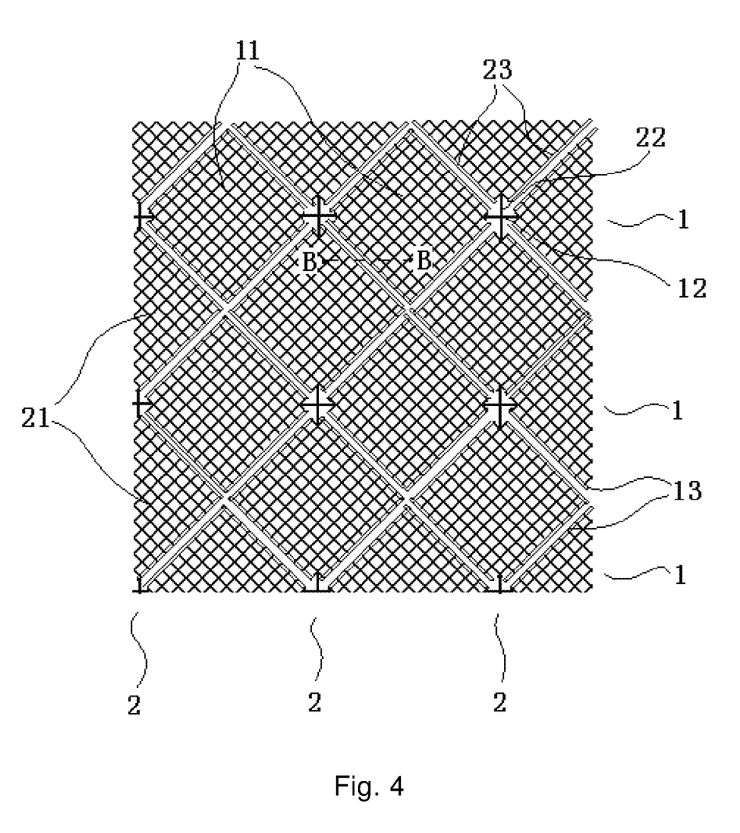
FIG. 4 is a partial top structural diagram of an touch substrate in an embodiment 1 of the present invention (the insulation layer is transparent)
Figure 6:
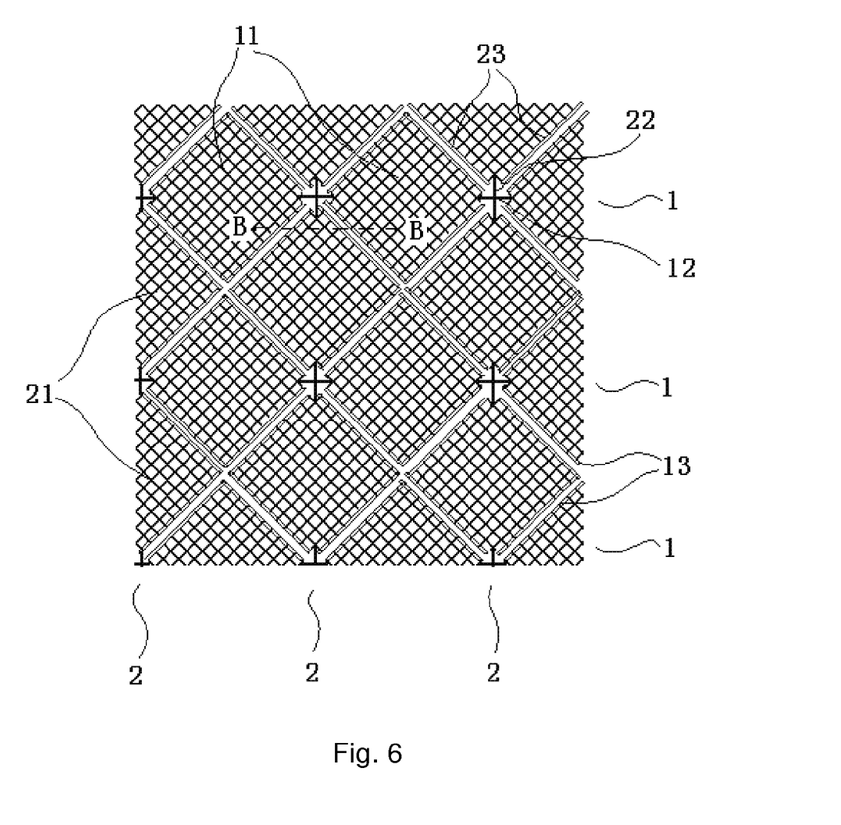
FIG. 6 is a partial top structural diagram of an touch substrate in an embodiment 2 of the present invention (the insulation layer is transparent)

A kind of Metal mesh touch substrate is shown in FIG. 1 to FIG. 3, and may be a protection plate at the most outside of the display screen, a touch structure of it is provided at one side of a base 9 (this side faces towards the display panel), a circle of black matrixes are provided in the periphery of the base 9 and used to shield leads (not shown in drawings) of the touch structure, the leads are provided at one side of the black matrixes far away from the base 9 (when viewing from the base 9, the leads are shielded by the black matrixes) and used to connect the driving electrodes 1 and the sensing electrodes 2 to a touch chip. A plurality of driving electrodes 1 arranged in a row direction (a horizontal direction) and a plurality of sensing electrodes 2 arranged in a column direction (a vertical direction) are provided in the middle of the base 9. Each of the driving electrodes 1 consists of a plurality of driving metal meshes 11 of diamond shape in one row, two adjacent driving metal meshes 11 are directly connected through a connection portion 12, and each of the sensing electrodes 2 consists of a plurality of sensing metal meshes 21 of diamond shape in one column, the sensing metal meshes 21 and the driving metal meshes 11 are in the same layer, two adjacent sensing metal meshes 21 are connected through a connecting bridge 22, wherein the connecting bridge 22 may be made of indium tin oxide to be an ITO bridge. The driving metal meshes 11, the sensing metal meshes 21 and the connection portion 12 are all provided on the base 9 and formed simultaneously, and are covered by an insulation layer 4, the connecting bridge 22 is provided on the insulation layer 4 and is connected to the sensing metal mesh 21 through a via in the insulation layer 4, so that the driving electrode 1 and the sensing electrode 2 are prevented from being conducted at overlap position thereof. In FIG. 1, FIG. 4 and FIG. 6, the connecting bridge 22 is actually located on the insulation layer 4, and is in the different layer from the metal meshes and the connection portion 12. However, as the insulation layer 4 is transparent, the connecting bridge 22, the metal meshes and the connection portion 12 are visible when they are viewed from above.

In the above example, the driving metal meshes 11 and the sensing metal meshes 21 are diamond shaped, of course, they may be of other shapes, for example, strip shaped, so long as the driving electrodes 1 and the sensing electrodes 2, which intersect with each other, can be formed, and the adjacent metal meshes of the electrodes of different types may form a capacitance therebetween, which will not be discussed one by one herein.

It can be seen that, the touch structure of the Metal mesh touch substrate is provided on a substrate, belongs to an OGS (One glass solution) mode, which is beneficial to reduce the thickness of the touch screen. Meanwhile, since the electrodes are all formed in the same layer, only four procedures are needed: forming the black matrixes, forming a metal layer (including the driving metal meshes 11, the sensing metal meshes 21 and the connection portion 12), forming the insulation layer 4 with vias, and forming the connection bridge 22, therefore, the manufacturing method is simple.

However, the solution in which the driving metal meshes 11 and the sensing metal meshes 21 are provided in the same layer may bring about some problems, as shown in FIG. 1, a capacitance is mainly formed between the driving electrode 1 and the sensing electrode 2 by adjacent side surfaces of the driving electrode 1 and the sensing electrode 2 (in other words, edges of the metal meshes). However, the areas of the side surfaces of the metal meshes are very small, and when a driving electrode 1 and a sensing electrode 2 are adjacent, only a distance between protruding points of the mesh lines of the metal meshes, which are directly opposite to each other, indicates the small distance between the two electrodes, but distances between other portions of the electrodes are relatively large, resulting in a small capacitance between the driving electrode 1 and the sensing electrode 2, thus the signal-noise ratio is low, the detection effect is poor, and an existing touch chip cannot be applied thereto.

SUMMARY OF THE INVENTION

In view of the above problem of small sensing capacitance between electrodes in the touch substrate, the present invention provides a touch substrate and a touch screen, which have a large sensing capacitance between the electrodes.

A solution adopted to solve the technical problem of the invention is a touch substrate, which comprises a plurality of first electrodes and a plurality of second electrodes which intersect with each other, each of the first electrodes includes a plurality of first metal meshes, adjacent first metal meshes are connected through a connection portion, each of the second electrodes includes a plurality of second metal meshes, adjacent second metal meshes are connected through a connection bridge, the first metal meshes, the second metal meshes and the connection portion are in the same layer, and an insulation layer is provided between the layer in which the connection portion is located and the layer in which the connection bridge is located, wherein at least a part of edges of the first metal mesh is provided with a first side strip thereat, and the first side strip is adjacent to a corresponding second metal mesh and is connected to the first metal mesh; and/or at least a part of edges of the second metal mesh is provided with a second side strip thereat, and the second side strip is adjacent to a corresponding first metal mesh and is connected to the second metal mesh.

The "side strip" refers to a conductive structure which is a long strip and distributed along the edge of the metal mesh, when viewing from above, the side strip connects the ends of the mesh lines at the edge of the metal mesh together, so that the edge of the metal mesh is converted into a straight line shape from a mesh shape. Meanwhile, each side strip is connected to the metal mesh corresponding thereto, that is to say, if one side strip is at an edge of an A metal mesh, the side strip is connected to the A metal mesh.

In the touch substrate of the present invention, at least one edge of each of the metal meshes is provided with the side strip, so that opposite areas between adjacent metal meshes are increased (or the distance between the adjacent metal meshes is reduced), thus the capacitance between the electrodes is increased, then the signal-noise ratio may be increased, the touch effect may be improved and the existing touch chip may be applied.

Preferably, each of the edges of the first metal mesh is provided with the first side strip thereat, and each of the edges of the second metal mesh is provided with the second side strip thereat.

Preferably, the first side strip and the second side strip are in the same layer.

Further preferably, both of the first side strip and the second side strip are in the same layer as the first metal meshes.

Further preferably, the first side strip, the second side strip, the first metal meshes, the second metal meshes and the connection portion are made of the same metal.

Further preferably, the first side strip, the second side strip and the connection bridge are in the same layer, the first side strip is connected to the first metal mesh through a via in the insulation layer, and the second side strip is connected to the second metal mesh through a via in the insulation layer.

Further preferably, the first side strip, the second side strip and the connection bridge are made of the same material.

Preferably, the first electrodes are driving electrodes and the second electrodes are sensing electrodes.

Preferably, the second electrodes are driving electrodes and the first electrodes are sensing electrodes.

A solution adopted to solve the problems of the present invention is a touch screen comprising the above touch substrate.

DETAILED DESCRIPTION OF THE EMBODIMENTS

In order to make persons skilled in the art better understand solutions of the present invention, the present invention will be further described in detail below in conjunction with the drawings and embodiments.

Embodiment 1

Figure 5:
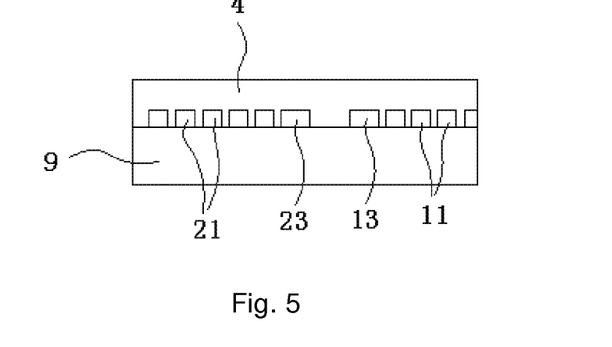
FIG. 5 is a cross-sectional structural diagram of the touch substrate in FIG. 4 taken along BB line.

The present embodiment provides a touch substrate, as shown in FIG. 4 and FIG. 5, which comprises a base 9, and a plurality of first electrodes and a plurality of second electrodes, which intersect with each other, provided on the base 9.

Preferably, in the present embodiment, the driving electrodes 1 are first electrodes, and the sensing electrodes 2 are second electrodes, accordingly, first metal meshes are driving metal meshes 11, a first side strip is a driving side strip 13, second metal meshes are sensing metal meshes 21 and a second side strip is a sensing side strip 23.

The reason for the above setting is in that, the first electrodes are directly connected through the connection portions 12 and thus the resistance is small, and signals to be loaded on the driving electrodes 1 are relatively large, thus smaller resistance is required to increase the load capacity, therefore, such connected first electrodes are suitable for being the driving electrode 1. Certainly, it should be understood that, using the sensing electrode 2 as the first electrode and the driving electrode 1 as the second electrode is possible, only the connection relationship between them and the touch chip are required to be changed, which will not discussed herein.

The touch substrate is provided outside the light output surface of the display panel, and may also be used as a protection plate for the display panel. The related touch structure is usually provided on the same side of the base 9, and this side of the base 9 is provided to face towards the display panel. In the periphery of the base 9, black matrixes are provided to prevent leads of the driving structure from exposing. Certainly, the touch substrate may also be used as other structure such as a color filter substrate. In summary, if a substrate has the touch structure of the present embodiment, it may become the touch substrate.

Specifically, each driving electrode 1 includes a plurality of driving metal meshes 11, two adjacent driving metal meshes 11 are connected through a connection portion 12, and each sensing electrode 2 includes a plurality of sensing metal meshes 21, and two adjacent sensing metal meshes 21 are connected through a connection bridge 22.

That is to say, as shown in FIG. 4, the touch substrate usually comprises a plurality of "metal meshes", which are spaced from each other, these metal meshes may be of diamond shape, thus the touch substrate is almost covered by the metal meshes, each of edges of each metal mesh consists of protruding portions of a plurality of mesh lines, as shown in FIG. 4, the driving metal meshes 11 in the same row are connected through the connection portions 12 so as to form a driving electrode 1, and the sensing metal meshes 21 in the same column are connected through the connection bridges 22 so as to form a sensing electrode 2. It can be seen from above that, a capacitance may be formed between adjacent edges of a sensing metal mesh 21 and a driving metal mesh 11 so as to sense a touch.

The driving metal meshes 11, the sensing metal meshes 21 and the connection portions 12 are provided in the same layer, and an insulation layer 4 is provided between the layer in which the connection bridges 22 are located and the layer in which the connection portions 12 are located.

That is to say, the driving metal meshes 11, the sensing metal meshes 21 and the connection portions 12 are provided in the same layer, the insulation layer 4 is provided between the layer and the connection bridges 22, and the connection bridges 22 are connected to the sensing metal meshes 21 through vias in the insulation layer 4.

Preferably, the insulation layer 4 covers the driving metal meshes 11, the sensing metal meshes 21 and the connection portions 12, and the connection bridges 22 are provided on the insulation layer 4.

That is to say, the connection bridges 22 are preferably provided on one side of the layer in which the metal meshes are located far away from the base, that is, the connection bridges 22 is farther away from the base 9 than the layer in which the metal meshes are located. Certainly, it is possible to provide the connection bridges 22 on one side of the layer in which the metal meshes are located close to the base (of course, the insulation layer 4 is still located between the connection bridges 22 and the layer in which the metal meshes are located).

Preferably, the connection bridges 22 may be made of a transparent material such as indium tin oxide, that is, the connection bridges 22 may be ITO bridges.

Driving side strips 13 are provided at edges of the driving metal meshes 11, a driving side strip 13 is adjacent to a sensing metal mesh 21 and is connected to a driving metal mesh 11; and/or sensing side strips 23 are provided at edges of the sensing metal meshes 11, a sensing side strip 23 is adjacent to a driving metal mesh 11 and is connected to a sensing metal mesh 21.

That is to say, as shown in FIG. 4, at least a part of edges of each metal mesh is adjacent to other metal meshes, and at least a portion of positions of these edges is provided with a "side strip". As described above, in the existing Metal mesh touch substrate, between two adjacent metal meshes, only the distance between the opposite points of the protruding portions of the mesh lines is small, resulting in a small capacitance therebetween, a small signal-noise ratio and a poor touch effect. In the touch substrate of the present embodiment, a side strip is provided at the edge of the metal mesh, the side strip is a complete strip and connected to the metal mesh, so that the edge of the metal mesh provided with the side strip actually becomes a regular strip from an original uneven mesh, therefore, opposite areas between adjacent meshes are enlarged and thus the capacitance therebetween is increased, and the touch effect is improved.

Preferably, each of the edges of the driving metal meshes 11 is provided with the driving side strip 13 thereat, and each of the edges of the sensing metal meshes 21 is provided with the sensing side strip 23 thereat.

That is to say, preferably, each of the edges of each metal mesh is provided with the side strip thereat, thus the metal meshes are adjacent to each other with their respective side strips opposite to each other, the opposite areas thereof are maximum and are the same as those when the electrodes are of strip shape, and the distance therebetween is minimum, thus a maximum capacitance may be obtained so as to better improve the driving effect, and furthermore, difference between the capacitance and that obtained by using conventional electrode is small, therefore, the existing touch chip can be used.

Preferably, the above driving side strips 13 and the sensing side strips 23 are in the same layer.

Apparently, when the above driving side strips 13 and the sensing side strips 23 are in the same layer, opposite areas of side surfaces thereof are large, and the distance therebetween is small, thus a larger capacitance may be obtained.

Preferably, as shown in FIG. 5, the above driving side strips 13 and the sensing side strips 23 are in the same layer as the driving metal meshes 11, the sensing metal meshes 21 and the connection portions 12.

That is to say, the above driving side strips 13 and the sensing side strips 23 are preferably provided in the layer in which the metal meshes are located. When the side strips are in the same layer as the metal meshes, the side strips preferably directly connect ends of the mesh lines at edges of the metal meshes to form into a strip shape. Certainly, the side strip may only connect to ends of a part of the mesh lines, and ends of other mesh lines are inside the side strip (which is closer to the center of the metal mesh than the side strip).

Preferably, the above driving side strips 13, the sensing side strips 23, the driving metal meshes 11, the sensing metal meshes 21 and the connection portions 12 are made of the same material, and further preferably formed simultaneously.

The "side strip" refers to a conductive structure which is a long strip and distributed along the edge of the metal mesh, when viewing from above, the side strip connects the ends of the mesh lines at the edge of the metal mesh together, so that the edge of the metal mesh is converted into a straight line shape from a mesh shape. Meanwhile, each side strip is connected to the metal mesh corresponding thereto, that is to say, if one side strip is at an edge of an A metal mesh, the side strip is connected to the A metal mesh.

If metal meshes are made of silver, a mesh pattern of silver bromide may be formed through a screen printing process first, then the silver bromide is converted into silver, thus a metal mesh is formed. If metal meshes are made of aluminum, copper, molybdenum, niobium or alloy thereof, then the metal meshes may be formed by a patterning process, the patterning process refers to a known technology in which a pattern structure is formed through a film, and usually includes one or more of steps of forming a film layer, applying photoresist, exposure, development, etching, peeling off photoresist and the like, which will not be described in detail herein. It can be seen from above that, both of the patterning process and the screen printing process may form all structures in one layer through a single process without considering the pattern of specific structures in the layer. Therefore, if the side strips and the original structures in the layer in which the metal meshes are located are formed simultaneously, it is unnecessary to add a new process, only changes in the pattern formed in the step are needed, thus the process is simple. Meanwhile, the side strips are made of metal and are integrated with the metal meshes, therefore their resistance is small and ohm contact resistance cannot be generated, and thus the resistance is not increased.

Certainly, it is possible for the side strips to be formed by a separated process, or formed of other different materials.

Embodiment 2

Figure 7:
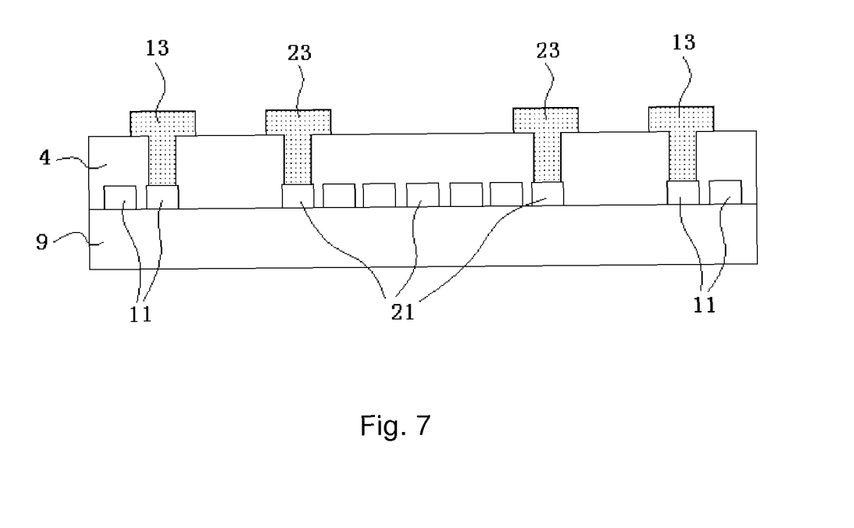
FIG. 7 is a cross-sectional structural diagram of the touch substrate in FIG. 6 taken along BB line.

As shown in FIG. 6 and FIG. 7, the present embodiment provides a touch substrate, which comprises a similar structure of the touch substrate of the embodiment 1.

Unlike the touch substrate of the embodiment 1, in the present embodiment, the driving side strips 13 and the sensing side strips 23 are in the same layer as the connection portions 22, and as shown in FIG. 7, the driving side strips 13 are connected to the driving metal meshes 11 through vias in the insulation layer 4, and the sensing side strips 23 are connected to the sensing metal meshes 21 through vias in the insulation layer 4. While the driving side strips 13 and the sensing side strips 23 are in a different layer from that in the embodiment 1, the difference cannot be shown in the top diagram, thus the structure in FIG. 6 seems similar to that in FIG. 4.

Preferably, each side strip is respectively connected to all ends of the mesh lines at an edge of the metal mesh through vias, so that the connection resistance is decreased. Certainly, each side strip being connected to part of mesh lines (for example, only two ends of the side strip being connected to the metal mesh) is also feasible.

Preferably, the driving side strips 13, the sensing side strips 23 and the connection portions 22 are made of the same material (indium tin oxide); and further preferably, the driving side strips 13, the sensing side strips 23 and the connection portions 22 are formed simultaneously.

That is to say, the side strips in the present embodiment is not in the same layer as the metal meshes, but in the same layer as the connection bridges 22. Certainly, in this case, in order to connect a side strip with a corresponding metal mesh, vias are required to be provided in the insulation layer 4. Obviously, the side strips should be preferably formed simultaneously with the connection bridges 22, thus, the side strips may be formed simultaneously with the connection bridges 22 only by changing the specific pattern formed in the patterning process for forming the connection bridges 22 without adding a new process.

Certainly, it should be understood that, various changes may be made to the above embodiments, for example, each metal mesh may also be any other known shape such as a bar shape; a side strip may also be located at a part of an edge of a metal mesh; part of the side strips are in the same layer as the metal meshes, and the other part thereof may be in the same layer as the connection bridges; and the side strips may also be provided in a new added layer (that is, in a different layer from the metal meshes and the connection bridges), and the like.

Embodiment 3

The present embodiment provides a touch screen comprising any one of the above touch substrates. The touch screen may be any product or member with displaying function such as a liquid crystal panel, an electronic paper, an OLED panel, a mobile phone, a tablet computer, a TV, a monitor, a notebook computer, a digital photo frame, a navigator and so on.

It can be understood that, the foregoing implementations are merely exemplary implementations used for explaining the principle of the present invention, but the present invention is not limited thereto. Those of ordinary skill in the art may make various variations and improvements without departing from the spirit and essence of the present invention, and these variations and improvements also fall within the protection scope of the present invention.

The invention claimed is:

1. A touch substrate, comprising a plurality of first electrodes and a plurality of second electrodes which intersect with each other,
   each of the first electrodes includes a plurality of first metal meshes, adjacent first metal meshes are connected through a connection portion,
   each of the second electrodes includes a plurality of second metal meshes, adjacent second metal meshes are connected through a connection bridge,
   the first metal meshes, the second metal meshes and the connection portion are in the same layer, and
   an insulation layer is provided between the layer in which the connection portion is located and the layer in which the connection bridge is located,
   wherein at least a part of edges of the first metal mesh is provided with a first side strip thereat, and the first side strip is adjacent to a corresponding second metal mesh and is connected to the first metal mesh; and/or
   at least a part of edges of the second metal mesh is provided with a second side strip thereat, and the second side strip is adjacent to a corresponding first metal mesh and is connected to the second metal mesh;
   wherein the first side strip and the second side strip are provided in a different layer from the first metal mesh, the second metal mesh, the connection portion, and the connection bridge;
   wherein the first side strip and the second side strip are in the same layer; and
   wherein the first side strip is connected to the first metal mesh through a via in the insulation layer, and
   the second side strip is connected to the second metal mesh through a via in the insulation layer.

2. The touch substrate of claim 1, wherein
   each of the edges of the first metal mesh is provided with the first side strip thereat, and
   each of the edges of the second metal mesh is provided with the second side strip thereat.

3. The touch substrate of claim 2, wherein
   the first side strip, the second side strip, the first metal meshes, the second metal meshes and the connection portion are made of the same metal.

4. The touch substrate of claim 2, wherein the first side strip, the second side strip and the connection bridge are made of the same material.

5. The touch substrate of claim 2, wherein
   the first electrodes are driving electrodes and the second electrodes are sensing electrodes.

6. The touch substrate of claim 2, wherein
   the second electrodes are driving electrodes and the first electrodes are sensing electrodes.

7. The touch substrate of claim 1, wherein
   the first side strip, the second side strip, the first metal meshes, the second metal meshes and the connection portion are made of the same metal.

8. The touch substrate of claim 1, wherein the first side strip, the second side strip and the connection bridge are made of the same material.

9. The touch substrate of claim 1, wherein
   the first electrodes are driving electrodes and the second electrodes are sensing electrodes.

10. The touch substrate of claim 1, wherein
    the second electrodes are driving electrodes and the first electrodes are sensing electrodes.

11. A touch screen comprising:
the touch substrate of claim 1.

\* \* \* \* \*